United States Patent
Dean

(10) Patent No.: US 7,156,272 B2
(45) Date of Patent: Jan. 2, 2007

(54) GOLF BAG CARRIER FOR A MOTORCYCLE

(76) Inventor: Frank Dean, 1811 Morin Dr., Bay City, MI (US) 48708

( * ) Notice: Subject to any disclaimer, the term of this patent is extended or adjusted under 35 U.S.C. 154(b) by 266 days.

(21) Appl. No.: 10/646,138

(22) Filed: Aug. 22, 2003

(65) Prior Publication Data

US 2005/0040196 A1  Feb. 24, 2005

(51) Int. Cl.
*B62J 7/00* (2006.01)

(52) U.S. Cl. .......................... 224/413; 224/423

(58) Field of Classification Search ................ 224/413, 224/419, 422, 424, 425, 401, 423
See application file for complete search history.

(56) References Cited

U.S. PATENT DOCUMENTS

| | | | | |
|---|---|---|---|---|
| 1,683,169 | A * | 9/1928 | De Noya | 224/42.39 |
| 3,286,891 | A * | 11/1966 | Jones, Jr. | 224/455 |
| 3,659,761 | A * | 5/1972 | Wesson | 224/442 |
| 3,827,613 | A * | 8/1974 | Meyer | 224/457 |
| 3,938,719 | A | 2/1976 | Carlton | |
| 4,296,878 | A * | 10/1981 | Ward et al. | 224/459 |
| 4,387,836 | A * | 6/1983 | Laesch | 224/412 |
| 4,393,986 | A * | 7/1983 | Sirey | 224/443 |
| 5,207,361 | A * | 5/1993 | Slifka | 224/419 |
| 5,340,003 | A | 8/1994 | Wilson | |
| 5,482,304 | A | 1/1996 | Smith | |
| 5,762,249 | A * | 6/1998 | Hann | 224/430 |
| 6,039,227 | A | 3/2000 | Stark | |
| 6,149,041 | A * | 11/2000 | Perino et al. | 224/645 |
| D437,578 | S | 2/2001 | Stannard-Warne | |
| 6,305,702 | B1 | 10/2001 | Alford | |
| 6,401,998 | B1 | 6/2002 | Puluso | |
| 6,409,188 | B1 | 6/2002 | Hesmer | |
| 6,457,618 | B1 * | 10/2002 | Hancock et al. | 224/401 |
| 6,554,171 | B1 | 4/2003 | Ewing | |
| 6,619,522 | B1 * | 9/2003 | Schurr | 224/413 |
| 6,698,635 | B1 * | 3/2004 | Brown | 224/413 |
| 6,938,806 | B1 * | 9/2005 | James | 224/413 |
| 2003/0057242 | A1 * | 3/2003 | Schurr | 224/413 |
| 2003/0209581 | A1 * | 11/2003 | Adams | 224/413 |

FOREIGN PATENT DOCUMENTS

JP  06072371 A  * 3/1994

* cited by examiner

*Primary Examiner*—Nathan J. Newhouse
*Assistant Examiner*—Justin M. Larson
(74) *Attorney, Agent, or Firm*—Robert L. McKellar; McKellar IP Law, PLLC

(57) ABSTRACT

A carrier for mounting to a motorcycle, the carrier for carrying a golf bag on the motorcycle, the motorcycle having passenger foot pegs. The carrier includes an elongated mounting frame member having an attachment means for attaching the mounting frame member to the motorcycle, a U shaped first support member attached to the mounting frame member so that the first support member extends laterally from the mounting frame member and a second U shaped elongated support member attached to the mounting frame member so that the second support member extends laterally from the mounting frame member, the second support member being spaced apart from the first support member so that when the mounting frame member is attached to a motorcycle the bottom of the U shaped portion of the first and second support members aligns with the passenger foot peg of the motorcycle so that when a golf bag is placed on the carrier, the golf bag is cradled in the U shaped portion of the first and second support members with the bottom of the golf bag resting on the passenger foot peg of the motorcycle.

11 Claims, 3 Drawing Sheets

GOLF BAG CARRIER FOR A MOTORCYCLE

BACKGROUND

Cyclists have invented a number of devices for transporting a golf bag filled with golf clubs and equipment on a tricycle, bicycle or motorcycle. For example, Smith (U.S. Pat. No. 5,482,304) invented an attachment device for trailing a golf cart (containing the golf bag) behind a bicycle. Carlton (U.S. Pat. No. 3,938,719) invented a device capable of holding a golf bag to the front wheel assembly of a motorcycle. Laesch (U.S. Pat. No. 4,387,836) invented a carrier for carrying a golf bag between the rear wheels of an adult tricycle. Slifka (U.S. Pat. No. 5,207,361) invented a golf bag carrier for a motorcycle having passenger foot pegs, the carrier attached to one of the foot pegs, the bottom of the golf bag resting on and was strapped to the carrier while the upper portion of the golf bag was strapped to the passenger seat of the motorcycle.

The above inventions have a number of problems. The device of the '304 patent is not suitable for the higher speeds of a motorcycle. The device of the '719 patent unbalances the steering of a motorcycle. The device of the '836 patent is not suitable for a conventional two wheeled motorcycle. The device of the '361 patent is probably the best available for carrying a golf bag on a motorcycle. However, the device of the '361 patent requires straps and the position of the upper portion golf bag can shift while the motorcycle is in motion.

SUMMARY OF THE INVENTION

The instant invention is a solution, at least in part, to the above stated problems. The instant invention provides a carrier attached to a motorcycle so that the bottom of the golf bag rests on a passenger foot peg of the motorcycle while the upper portion of the golf bag is cradled in a support structure. Preferably, the golf bag is carried in a rearward reclining position by the carrier with the top of the golf bag angled toward the longitudinal centerline of the motorcycle so that the balance of the motorcycle is better maintained.

More specifically the instant invention is a carrier for mounting to a motorcycle, the carrier for carrying a golf bag on the motorcycle, the motorcycle having passenger foot pegs, the carrier comprising three elements. The first element is an elongated mounting frame member having attachment means for attaching the mounting frame member to the motorcycle. The second element is a first support member attached to the mounting frame member so that the first support member extends laterally from the mounting frame member, at least a portion of the first support member being U shaped. The third element is a second elongated support member attached to the mounting frame member so that the second support member extends laterally from the mounting frame member, at least a portion of the second support member being U shaped, the second support member being spaced apart from the first support member so that when the mounting frame member is attached to a motorcycle the bottom of the U shaped portion of the first and second support members aligns with the passenger foot peg of the motorcycle so that when a golf bag is placed on the carrier, the golf bag is cradled in the U shaped portion of the first and second support members with the bottom of the golf bag resting on the passenger foot peg of the motorcycle.

DETAILED DESCRIPTION OF THE INVENTION

Figure 1:
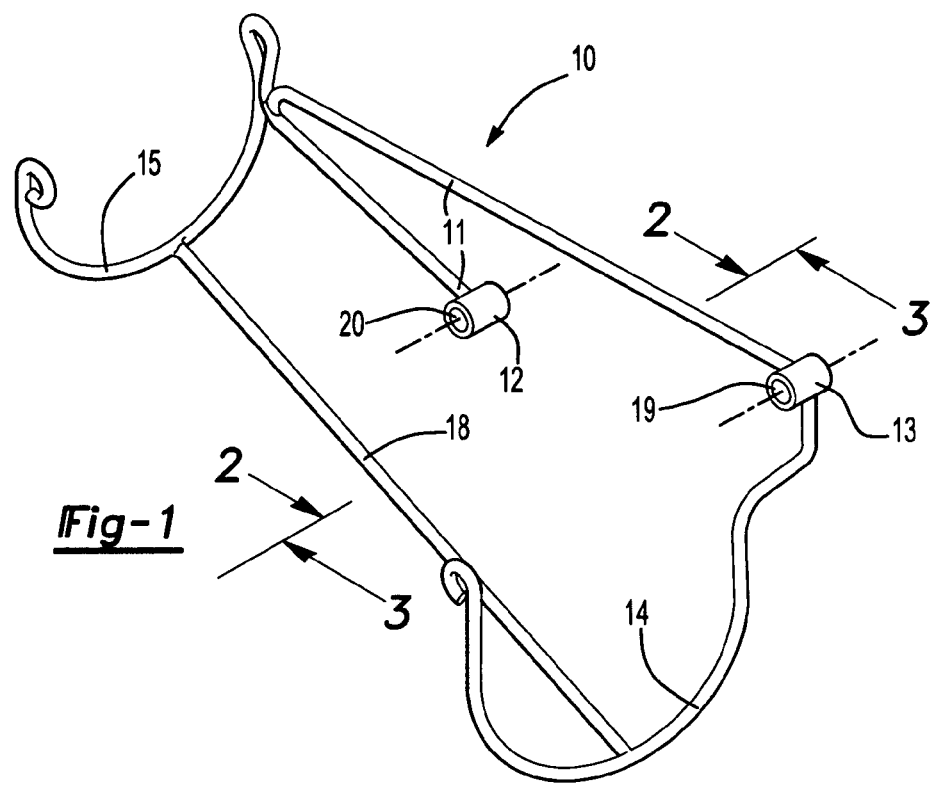
FIG. 1 is a perspective view of a carrier of the instant invention.

Referring now to FIG. 1, therein is shown a perspective view of a highly preferred carrier 10 of the instant invention. The carrier 10 is fabricated primarily from ⅜ inch diameter chromium plated steel rod. The carrier 10 includes a V shaped elongated mounting frame member 11 welded to 0.60 inch internal diameter chromium plated pipe sections 12 and 13 that serve as attachment means for attaching the mounting frame member 11 to a motorcycle. A first support member 14 is attached to the pipe section 13 of the mounting frame member 11 so that the first support member extends laterally from the mounting frame member 11. Most of the first support member 14 is U shaped as shown. A second elongated support member 15 is attached to the mounting frame member 11 so that the second support member 15 extends laterally from the mounting frame member 11. Most of the second support member 15 is also U shaped as shown. In addition, the second support member 15 is spaced apart from the first support member 14 so that when the mounting frame member 11 is attached to a motorcycle the bottom of the U shaped portion of the first and second support members 14 and 15 aligns with the passenger foot peg 16 of the motorcycle as shown in FIG. 4 so that when a golf bag 17 is placed on the carrier 10, the golf bag 17 is cradled in the U shaped portion of the first and second support members 14 and 15 with the bottom of the golf bag resting on the passenger foot peg 16 of the motorcycle as shown in FIG. 5.

Referring again to FIG. 1, it should be understood that the term "elongated" in elongated frame member means elongated in the direction of the longitudinal axis of the motorcycle when the carrier is mounted to the motorcycle. It should also be understood that the elongated frame member can be V shaped as show or any other suitable shape and that the carrier 10 can be fabricated of any suitable material. The carrier 10 also comprises an optional chromium plated steel rod 18 connecting the bottom of the U shaped portion of second support member 15 with the bottom of the U shaped portion of first support member 14. Although it is preferable that the U shaped portion of the support members 14 and 15 be circular in shape to match the circular shape of most golf bags, it should be understood that the U shaped portion of the support members can be parabolic or even a square bottomed U shape as desired.

Figure 2:
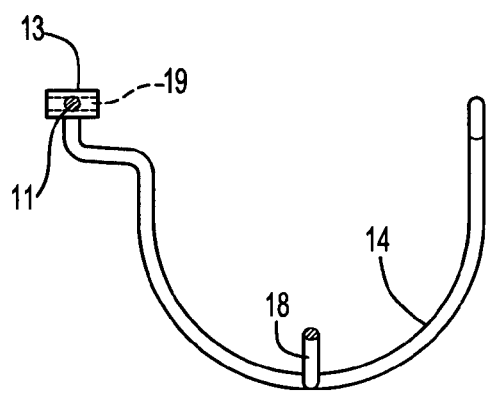
FIG. 2 is a sectional view of the carrier of FIG. 1, from the direction indicated in FIG. 1.
Figure 3:
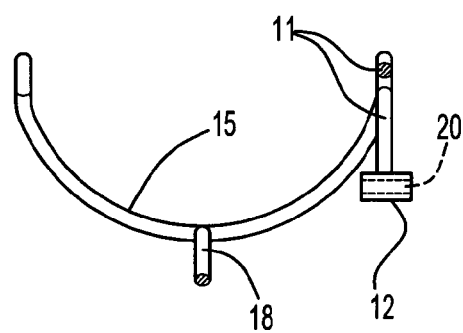
FIG. 3 is a sectional view of the carrier of FIG. 1, from the opposite direction as indicated in FIG. 1.

Referring now to FIG. 2, therein is shown a sectional view of the carrier 10 of FIG. 1, from the direction indicated in FIG. 1. Referring now to FIG. 3, therein is shown a sectional view of the carrier 10 of FIG. 1, from the opposite direction indicated in FIG. 1. Referring now to FIGS. 2 and 3, the passageways 19 and 20 through pipe sections 13 and 12 of mounting frame member 11 are designed to be aligned with at least two fastener or fastener receiving means of the motorcycle so that the mounting frame member 11 can be attached to the motorcycle by fasteners extended through the passageways 19 and 20 and secured by fastener or fastener receiving means on the motorcycle.

Figure 4:
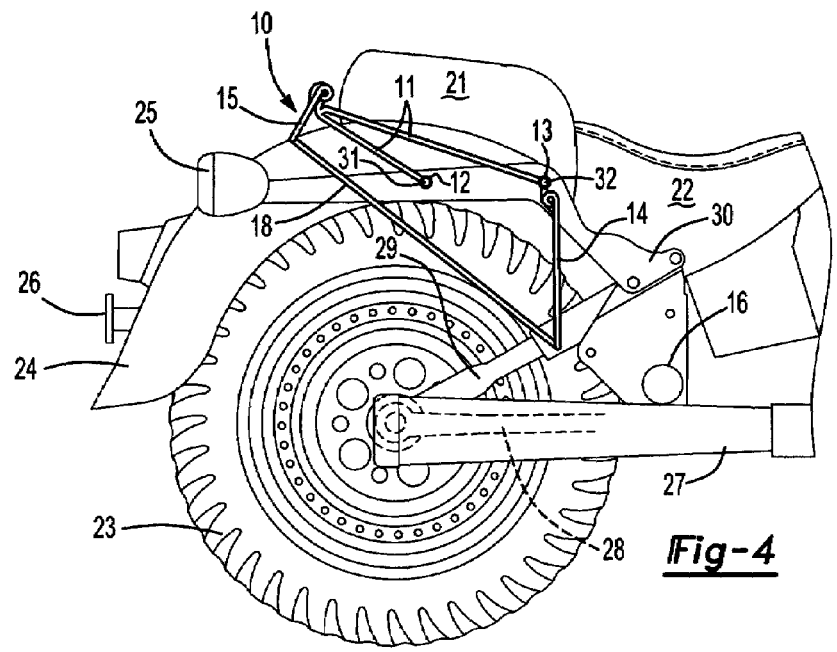
FIG. 4 is a side view showing the carrier of FIG. 1 mounted to the saddlebag mount of a motorcycle.
Figure 5:
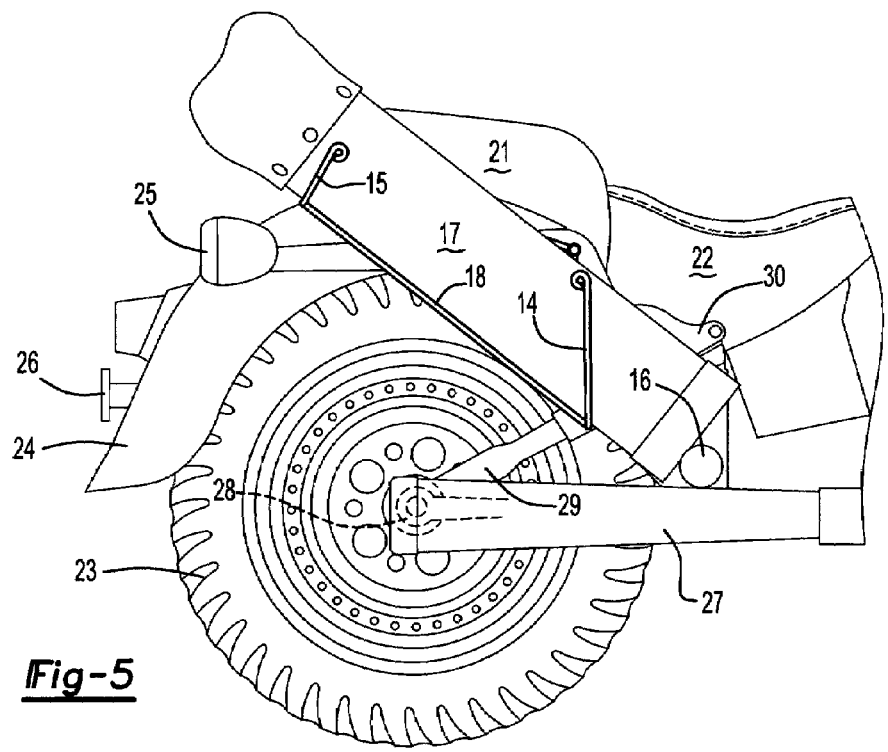
FIG. 5 is a side view showing a golf bag cradled in the carrier of FIG. 4.

Referring now to FIG. 4, therein is shown schematic side view of a rear portion of a motorcycle comprised of passenger seat 21, driver seat 22, rear wheel 23, rear fender 24, right turn signal light 25, reflector 26,. exhaust pipe 27, suspension link 28, suspension strut 29 and right saddlebag mounting bracket 30. The carrier 10 is mounted to the right saddlebag mounting bracket 30 by a threaded bolt 31 extending through pipe section 12 and having a threaded end portion threaded into a mating threaded portion of the saddlebag mounting bracket 30 or a threaded nut on the other side of the saddlebag mounting bracket 30; and by threaded bolt 32 extending through pipe section 13 and having a threaded end portion threaded into a mating threaded portion of the saddlebag mounting bracket 30 or a threaded nut on the other side of the saddlebag mounting bracket 30. Although threaded bolts are preferred as fasteners to fasten the carrier 10 to the motorcycle, any suitable fastener can be used and the carrier 10 can, of course, be welded to the motorcycle or a part of the motorcycle if desired. And, of course, the carrier 10 can be mounted to a motorcycle by way of threaded studs on the motorcycle extending through the pipe sections 12 and 13 and then secured by mated nuts. Preferably, the saddlebag mounting bracket 30 is a Ghost Bracket®, manufactured by Ghost Brackets Incorporated, Modesto Calif. Referring now to FIG. 5, a golf bag 17 is shown cradled in the carrier 10, the bottom of the golf bag 17 resting on the right passenger foot peg 16.

Figure 6:
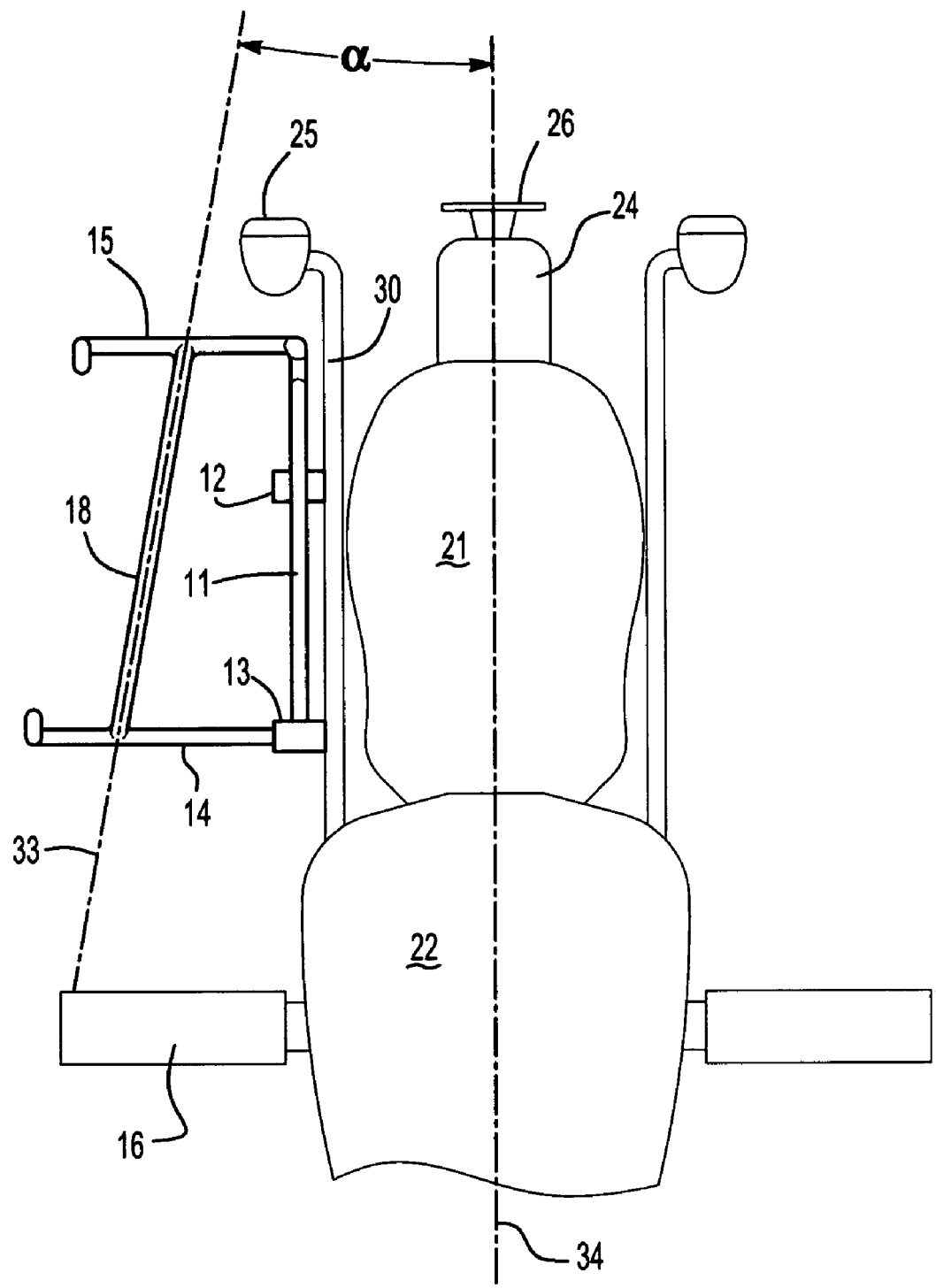
FIG. 6 is a top view of the carrier and motorcycle of FIG. 4.

Referring now to FIG. 6, therein is shown a top view of the carrier and motorcycle of FIG. 4. The angle α between the axis 33 from the bottom of the U shaped portion of the first and second support members 15 and 15 and the longitudinal axis 34 of the motorcycle is preferably greater than one degree and more preferably α is greater than five degrees. On the other hand, the angle α is preferably less than thirty degrees and more preferably the angle α is less than fifteen degrees.

The description above relates primarily to a specific embodiment. However, the disclosure of such specific embodiment is not intended as a limitation of the scope of the instant invention. Thus, it is readily apparent that although the invention has been primarily described in relation with its preferred embodiment, it should be understood that the scope of the instant invention is not limited thereby but is intended to cover all alternatives, modifications and equivalents that are included within the scope of the invention as defined by the following claims.

What is claimed is:

1. A carrier for mounting to a motorcycle, the carrier for carrying a golf bag on the motorcycle, the motorcycle having passenger foot pegs, comprising: an elongated mounting frame member having an attachment means for attaching the mounting frame member to the motorcycle; a first support member attached to the mounting frame member so that the first support member extends laterally from the mounting frame member, at least a portion of the first support member being U shaped; a second elongated support member attached to the mounting frame member so that the second support member extends laterally from the mounting frame member, at least a portion of the second support member being U shaped, the second support member being spaced apart from the first support member so that when the mounting frame member is attached to a motorcycle the bottom of the U shaped portion of the first and second support members aligns with the passenger foot peg of the motorcycle so that when a golf bag is placed on the carrier, the golf bag is cradled in the U shaped portion of the first and second support members with the bottom of the golf bag resting on the passenger foot peg of the motorcycle and wherein the top of the golf bag is carried in a rearward reclining position, wherein the attachment means comprises a plurality of passageways through the mounting frame member, at least two of the passageways aligned with at least two fastener receiving means of the motorcycle so that the mounting frame member can be attached to the motorcycle by fasteners extending through the passageways and secured by fastener receiving means.

2. The carrier of claim 1, wherein the angle between the axis from the bottom of the U shaped portion of the first and second support members to the passenger foot peg and the longitudinal axis of the motorcycle is greater than one degree and less than thirty degrees when viewed from the top of the motorcycle when the carrier is mounted on a motorcycle so that when a golf bag is cradled in the U shaped portion of the first and second support members with the bottom of the golf bag resting on the passenger foot peg of the motorcycle, the upper portion of the golf bag angles toward the longitudinal axis of the motorcycle when viewed from the top of the motorcycle.

3. The carrier of claim 2, wherein the angle is in the range of from five degrees to fifteen degrees.

4. The carrier of claim 1, wherein the angle between the axis from the bottom of the U shaped portion of the first and second support members to the passenger foot peg and the longitudinal axis of the motorcycle is greater than one degree and less than thirty degrees when viewed from the top of the motorcycle when the carrier is mounted on a motorcycle so that when a golf bag is cradled in the U shaped portion of the first and second support members with the bottom of the golf bag resting on the passenger foot peg of the motorcycle, the upper portion of the golf bag angles toward the longitudinal axis of the motorcycle when viewed from the top of the motorcycle.

5. The carrier of claim 4, wherein the angle is in the range of from five degrees to fifteen degrees.

6. The carrier of claim 1, wherein the fasteners are bolts having threaded end portions and the fastener receiving means comprises a threaded portion of the motorcycle matched to the threaded end portions of the bolts.

7. The carrier of claim 6, wherein the angle between the axis from the bottom of the U shaped portion of the first and second support members to the passenger foot peg and the longitudinal axis of the motorcycle is greater than one degree and less than thirty degrees when viewed from the top of the motorcycle when the carrier is mounted on a motorcycle so that when a golf bag is cradled in the U shaped portion of the first and second support members with the bottom of the golf bag resting on the passenger foot peg of the motorcycle, the upper portion of the golf bag angles toward the longitudinal axis of the motorcycle when viewed from the top of the motorcycle.

8. The carrier of claim 7, wherein the angle is in the range of from five degrees to fifteen degrees.

9. The carrier of claim 6, wherein the threaded portion of the motorcycle comprises a saddlebag mounting bracket.

10. The carrier of claim 9, wherein the angle between the axis from the bottom of the U shaped portion of the first and second support members to the passenger foot peg and the longitudinal axis of the motorcycle is greater than one degree and less than thirty degrees when viewed from the top of the motorcycle when the carrier is mounted on a motorcycle so that when a golf bag is cradled in the U shaped portion of the first and second support members with the bottom of the golf bag resting on the passenger foot peg of the motorcycle, the upper portion of the golf bag angles toward the longitudinal axis of the motorcycle when viewed from the top of the motorcycle.

11. The carrier of claim 10, wherein the angle is in the range of from five degrees to fifteen degrees.

* * * * *